United States Patent
Kluhsman

[11] Patent Number: 6,164,680
[45] Date of Patent: Dec. 26, 2000

[54] HITCH SOCKET COVER

[75] Inventor: Melvin L. Kluhsman, Lockwood, Mo.

[73] Assignee: Kluhsman Machine, Inc., Lockwood, Miss.

[21] Appl. No.: 09/296,229

[22] Filed: Apr. 22, 1999

[51] Int. Cl.[7] .................................................. B60D 7/00
[52] U.S. Cl. ............................................................ 280/507
[58] Field of Search .................................... 280/504, 507, 280/511; 150/154, 166; 293/142; D12/162, 400

[56] References Cited

U.S. PATENT DOCUMENTS

| D. 409,960 | 5/1999 | Young . | |
|---|---|---|---|
| D. 419,505 | 1/2000 | Deerman . | |
| D. 424,991 | 5/2000 | Young et al. . | |
| D. 425,460 | 5/2000 | Peroni . | |
| D. 425,833 | 5/2000 | Robinson . | |
| D. 426,798 | 1/2000 | Peroni . | |
| D. 430,519 | 9/2000 | Beauvais . | |
| 3,782,761 | 1/1974 | Cardin ....................................... | 280/507 |
| 5,603,178 | 2/1997 | Morrison ................................... | 40/591 |

OTHER PUBLICATIONS

Competitive catalog and advertising literature re hitch covers from Chevrolet, CMC, Inc., Bumperware, American Products Company, Bully Truck Accessories, ZTE Sport Truck Accessories.

Catalogue pp. 154–155 from Overton's re hitch covers.

Primary Examiner—Christopher P. Schwartz
Assistant Examiner—C. T. Bartz
Attorney, Agent, or Firm—Hovey, Williams, Timmons & Collins

[57] ABSTRACT

A hitch socket cover (12) is provided which is adapted to be releasably secured in covering relationship over the open end (16) of a hitch socket (10). The cover (12) includes a face plate (20) and a rearwardly extending marginal sidewall (24); the face plate fully covers the open end (16), whereas the sidewall (24) extends rearwardly in closely adjacent relationship with the sidewall (15, 18) of the socket (10). One or more threaded set screws (26, 28) extend through the sidewall (24) to releasably yet securely lock the cover (12) in place.

8 Claims, 1 Drawing Sheet

HITCH SOCKET COVER

BACKGROUND OF THE INVENTION

1. Field of the Invention

The present invention is broadly concerned with hitch socket covers adapted to be releasably placed over the sockets of conventional automotive hitches. More particularly, the invention pertains to such covers equipped with a face plate and a marginal sidewall so that the cover assumes a shallow cup-shaped configuration adapted to fit over a hitch socket; one or more set screws are provided through the cover sidewall and engageable with the hitch socket. In this way, the covers of the invention are both readily attachable, secure in connection, and impede theft thereof.

2. Description of the Prior Art

Many automobiles of various types are equipped with hitch assemblies. Such assemblies include elongated hitch sockets of substantially square tubular configuration which are adapted to releasably receive hitch components. When not in use, it is desirable to cover the open end of a hitch socket to prevent accumulation of dirt and debris. By the same token, many automotive enthusiasts wishing to improve the appearance of their vehicles employ covers over their hitch sockets.

Prior hitch socket covers have typically included a face plate together with a projecting element designed to fit within the confines of the socket. While this does provide a desirable cover function, these types of sockets can be easily removed by a thief simply by grasping the cover and pulling it from the socket. As a consequence, many owners find it difficult to keep hitch socket covers for any length of time.

There is accordingly a need in the art for an improved hitch socket cover providing an effective and aesthetically appealing cover while at the same time affording a hitch socket connection structure which deters theft.

SUMMARY OF THE INVENTION

The present invention overcomes the problems outlined above and provides a hitch socket cover designed to give a complete, surrounding cover effect. Moreover, the invention provides a cover connection in the form of one or more set screws extending through a sidewall of the socket cover and engageable with the socket body itself. In use, the cover is placed over the open end of a hitch socket and the set screws are tightened to bear against the socket body. This provides an effective cover but makes it impossible for a thief to simply grasp the cover and remove it without the use of tools.

In preferred forms, the cover of the invention is in the form of shallow cup-shaped body including a face plate and an essentially continuous sidewall extending from the face plate. A pair of opposed set screws extend through opposite portions of the sidewall and are engageable with the socket body.

DETAILED DESCRIPTION OF THE PREFERRED EMBODIMENT

Figure 1:
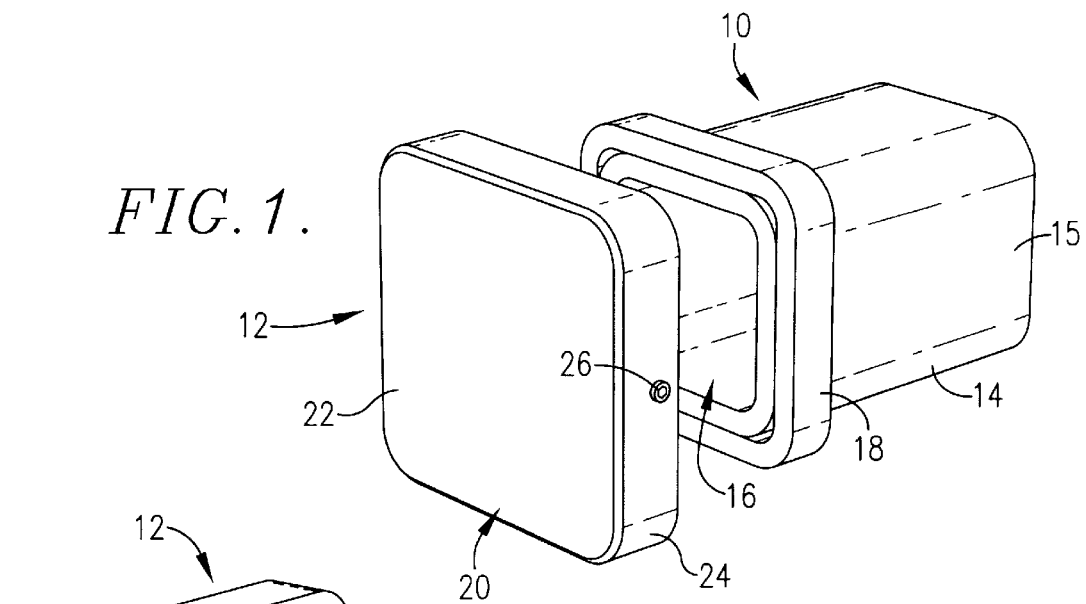
FIG. 1 is a fragmentary, exploded perspective view illustrating a conventional automotive hitch socket with a cover in accordance with the invention.
Figure 2:
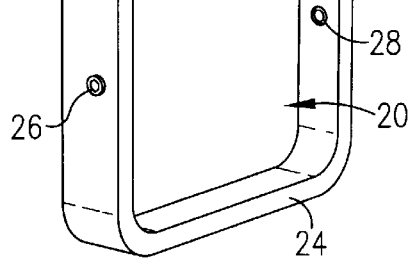
FIG. 2 is a perspective view illustrating the cover of the invention.

Turning now to the drawing, FIG. 1 illustrates a conventional automotive hitch socket 10 with a cover 12 in accordance with the invention. The socket 10 includes an elongated, tubular metallic section 14 presenting a sidewall 15 and an open end 16. A circumscribing metallic flange 18 is welded to the sidewall 15 and thus forms a continuation thereof. As illustrated, the flange 18 presents a substantially square shape with rounded corners.

Figure 3:
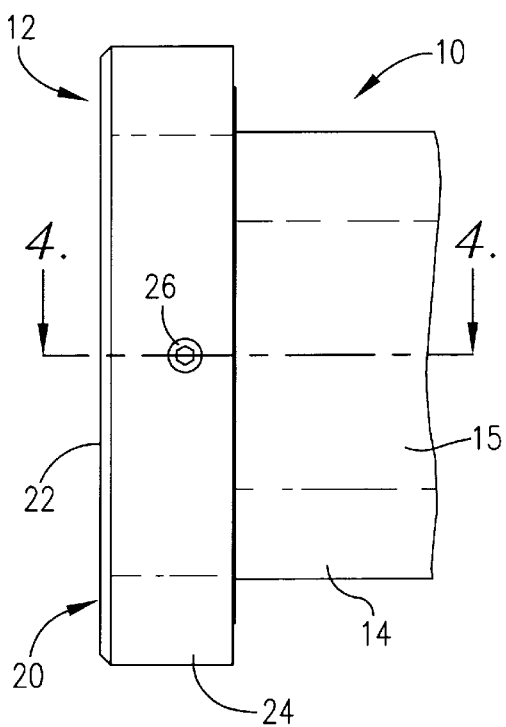
FIG. 3 is a fragmentary side view depicting the cover of the invention in place over a hitch socket.
Figure 4:
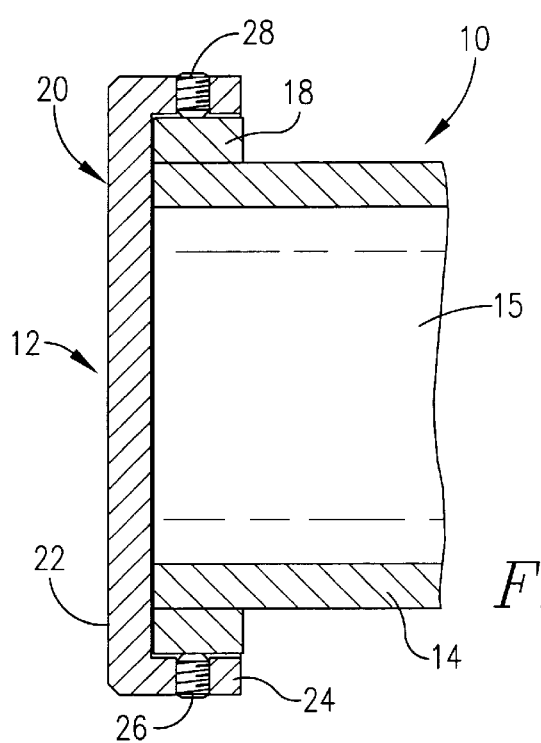
FIG. 4 is sectional view taken along line 4—4 of FIG. 3.

Cover 12 is generally cup-shaped and includes a face plate 20 configured to cover the open end 16 and the adjacent butt face of the flange 18. Typically though not necessarily, the outer surface 22 of plate 20 includes some indicia or decoration, such as a racing number. The cover 12 also has a rearwardly extending, continuous, circumscribing sidewall 24 which is permanently secured to or integral with plate 20. As best seen in FIGS. 3 and 4, the sidewall 24 is configured to extend around and lie in close adjacency to the outer surface of flange 18.

The cover 12 is maintained in place on socket 10 by means of a pair of set screws 26, 28 which are threadably retained in appropriate threaded openings provided through opposite portions of the sidewall 24. Each such set screw 26, 28 has a conventional exterior Allen fitting, and a frusto-conical inboard engagement end.

In use, the cover 12 is manually positioned over the open end of socket 10 as best seen in FIGS. 3 and 4. At this point, the user tightens the set screws 26, 28 using an appropriate Allen wrench, so as to cause the inboard ends of the set screws to bear against and engage the flange 18 forming a part of the socket sidewall. In this way, the cover 12 is securely positioned over the sockets 10 in such a way to inhibit easy theft thereof.

I claim:

1. A hitch socket cover adapted to fit over a hitch socket and comprising:

a cup-shaped body presenting a face plate and a sidewall extending from the face plate, said face plate configured to cover the open end of a hitch socket, with said sidewall adjacent a side margin of the socket, said sidewall circumscribing said face plate; and a connector including a set screw extending through and threadably secured to said sidewall, the inner end of set screw adapted to be engageable with a side margin of said socket for securing the body in place.

2. The cover of claim 1, including a pair of opposed set screws respectively secured to opposed portions of said sidewall.

3. The cover of claim 1, said face plate being generally square in shape with rounded corners.

4. A hitch socket cover adapted to fit over a hitch socket, said hitch socket comprising a generally square tubular section presenting a substantially flat open butt end, said open end having a maximum inside diameter, said tubular section having a butt end surface and a rearwardly extending outer periphery at said open end, said cover comprising:

a body presenting a face plate having front and rear surfaces and at least a pair of spaced, opposed sidewall segments extending rearwardly from the face plate to define with said face plate a recess between said sidewall segments adapted for receiving said butt end surface and portions of said outer periphery, said recess configured such that each of said sidewall segments is adapted to be in close overlying proximity with respective adjacent portions of said outer periphery; and a set screw located in each of said sidewall segments and adapted to be engageable with the respective adjacent portion of said periphery, each of said set screws adapted to be spaced from the front surface of said face plate a distance less than said maximum inside diameter.

5. The cover of claim 4, said rear surface of said face plate being substantially flat and adapted to extend across said open butt end without projecting into the open end.

6. The cover of claim 4, said sidewall circumscribing said face plate.

7. The cover of claim 6, the entirety of said circumscribing sidewall adapted for close overlying relationship with said periphery.

8. The cover of claim 4, said rear face of said face plate adapted for engagement with said butt end surface.

\* \* \* \* \*